United States Patent
Oikawa

(10) Patent No.: US 11,842,105 B2
(45) Date of Patent: Dec. 12, 2023

(54) PRINT SYSTEM AND CONTROL METHOD FOR PRINTING IN A STORE

(71) Applicant: CANON KABUSHIKI KAISHA, Tokyo (JP)

(72) Inventor: Ryo Oikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/820,204

(22) Filed: Aug. 16, 2022

(65) Prior Publication Data
US 2023/0075845 A1 Mar. 9, 2023

(30) Foreign Application Priority Data

Aug. 31, 2021 (JP) .................... 2021-140734

(51) Int. Cl.
*G06F 3/12* (2006.01)
(52) U.S. Cl.
CPC .......... *G06F 3/1238* (2013.01); *G06F 3/1222* (2013.01)
(58) Field of Classification Search
None
See application file for complete search history.

(56) References Cited

U.S. PATENT DOCUMENTS

| 2010/0225947 A1* | 9/2010 | Yoshida | ................ G06F 21/608 358/1.14 |
| 2015/0199161 A1* | 7/2015 | Gutnik | .................. G06F 3/1296 358/1.15 |

FOREIGN PATENT DOCUMENTS

| JP | 2004070542 A | 3/2004 |
| JP | 2015065592 A | 4/2015 |
| WO | WO-2013095498 A1 * | 6/2013 ............ G06F 17/211 |

* cited by examiner

*Primary Examiner* — Thomas D Lee
(74) *Attorney, Agent, or Firm* — Canon U.S.A., Inc. IP Division

(57) ABSTRACT

A print system communicable with an image forming apparatus to be installed in a store via a network includes one or more memories storing a set of instructions and one or more processors that execute the set of instructions to receive user identification information from the image forming apparatus, permit, in a case where a user indicated by the received user identification information is in the store, the user to use the image forming apparatus, and not permit, in a case where the user indicated by the received user identification information is not in the store, the user to use the image forming apparatus.

5 Claims, 8 Drawing Sheets

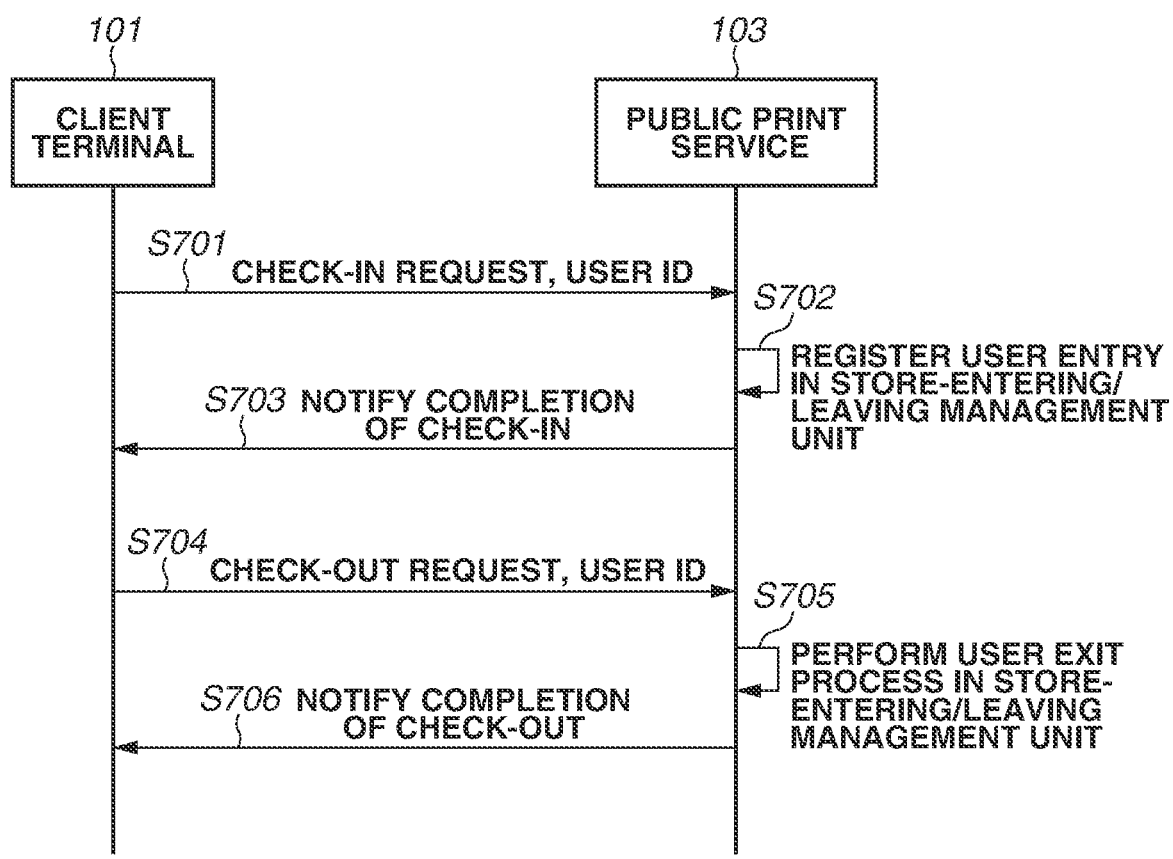

PRINT SYSTEM AND CONTROL METHOD FOR PRINTING IN A STORE

BACKGROUND

Field

The present disclosure relates to a print system for printing in a public space and a control method.

Description of the Related Art

In recent years, print systems using cloud print services have started to become widely available. In the cloud print services, users transmit print jobs from personal computers (PCs) to image forming apparatuses via cloud computing to perform printing. In such a print system, an administrator initially makes a device registration of an image forming apparatus with a tenant of a cloud print service to which the administrator belongs. The administrator sets the availability of the image forming apparatus for each user belonging to the tenant. Here, the tenant refers to a service system developed on cloud by a user, and has an access-limited storage area dedicated for registered users. For example, company A utilizes a cloud print service of a company A tenant, and the employees of company A are registered as users with the company A tenant, and image forming apparatuses of company A are also registered with the company A tenant. Thus, the users of company A can print out documents at any of the image forming apparatuses registered with the company A tenant, by inputting a print job from an internal terminal into the company A tenant.

Meanwhile, as working styles diversify, there is a demand for printing out documents in client terminals with an image forming apparatus installed in public spaces, such as convenience stores, libraries, and stations.

To meet such a demand, cloud print services for printing in public spaces are widely available. In general, these are cloud print services using a system structure called public cloud and have public print tenants, for example. Such cloud print services are called herein public print services. In some public print services, user administration may be performed based on public print tenants, or a guest print function may be provided regardless of the presence or absence of user administration. Image forming apparatuses for printing in public spaces are registered with public print tenants and managed therein.

Furthermore, due to the acceleration of the spread of teleworking, users may increasingly use shared offices and co-working spaces as well as conventional offices. The users who want to perform printing may perform printing at an image forming apparatus installed in shared offices or the like. For usage of these places, space matching services are provided through which users search for and reserve a desired place and pay a fee based on the time spent there. In these services, entering and leaving information such as times of entering and leaving the store is managed to determine the length of the time that the user has spent in the space.

As a method for printing in a public print service, for example, a print job is transmitted in advance from a client terminal such as a PC or a mobile terminal outside a shared office, and the print job is selected and is printed out from an image forming apparatus installed in the shared office. Further, the client terminal may transmit a print instruction in the shared office and printing may be performed by the image forming apparatus installed in the shared office.

Before the image forming apparatus displays a list of print jobs transmitted from the user and executes the print jobs, user authentication is performed. This is intended to avoid a security risk, such as other users seeing the names of print jobs of documents including confidential information or providing an instruction to print the documents.

Examples of a method for user authentication at the image forming apparatus include authentication based on one element such as a passcode called a PIN code. In general, the one-element authentication, which has a low security level, is used as a method for user authentication at the image forming apparatus because it is assumed that image forming apparatuses are usually installed in spaces closed to some extent, such as company offices.

Japanese Patent Application Laid-Open No. 2015-65592 discusses a technique in which a user who is attempting to perform authentication at an image forming apparatus transmits GPS history information recorded on their own mobile terminal to the image forming apparatus for authentication of the user, and the user authentication succeeds at the image forming apparatus only in a case where the positional information is appropriate.

Japanese Patent Application Laid-Open No. 2004-070542 discusses a technique in which the user uses an IC card both for authentication to enter a room and for authentication to use devices installed in the room.

In an image forming apparatus installed in a public space managed as a store, employing, for example, one-element authentication may cause a security risk. Many and unspecified people use the public space, so that confidential information may relatively easily leak to a third party due to peeping or mistyping of a PIN code. Thus, in printing with a public print service, if a user transmits in advance a print job from a client terminal outside a shared office, others may perform printing of the print job even in a case where the user is not in the shared office. Thus, if the account of a user not in a store is abused by a third party, the image forming apparatus installed in the public space may be wrongfully used.

According to Japanese Patent Application Laid-Open No. 2015-65592, at the time of user authentication, it is verified whether the user is located in front of the image forming apparatus based on the GPS information. However, if the public space is distributed among a plurality of floors, it is not possible to correctly determine which store the user has entered. Further, as a precondition, the user is to carry their mobile terminal and GPS information is to be collected for authentication. According to Japanese Patent Application Laid-Open No. 2004-070542, the user is to always carry their IC card to use the device, which reduces convenience for the user.

SUMMARY

Thus, the present disclosure is directed to providing a mechanism for controlling the use of an image forming apparatus which is installed in a store which is a public space, in accordance with the status of the user's entry to the store.

According to an aspect of the present disclosure, a print system communicable with an image forming apparatus to be installed in a store via a network includes one or more memories storing a set of instructions and one or more processors that execute the set of instructions to receive user identification information from the image forming apparatus, permit, in a case where a user indicated by the received user identification information is in the store, the user to use the image forming apparatus, and not permit, in a case where the user indicated by the received user identification information is not in the store, the user to use the image forming apparatus.

Further features of the present disclosure will become apparent from the following description of exemplary embodiments with reference to the attached drawings.

BRIEF DESCRIPTION OF THE DRAWINGS

FIG. 7 is a sequence diagram illustrating a processing of check-in to and check-out from the store.

DESCRIPTION OF THE EMBODIMENTS

Hereinafter, exemplary embodiments for carrying out the present disclosure will be described with reference to the accompanying drawings.

Figure 1:
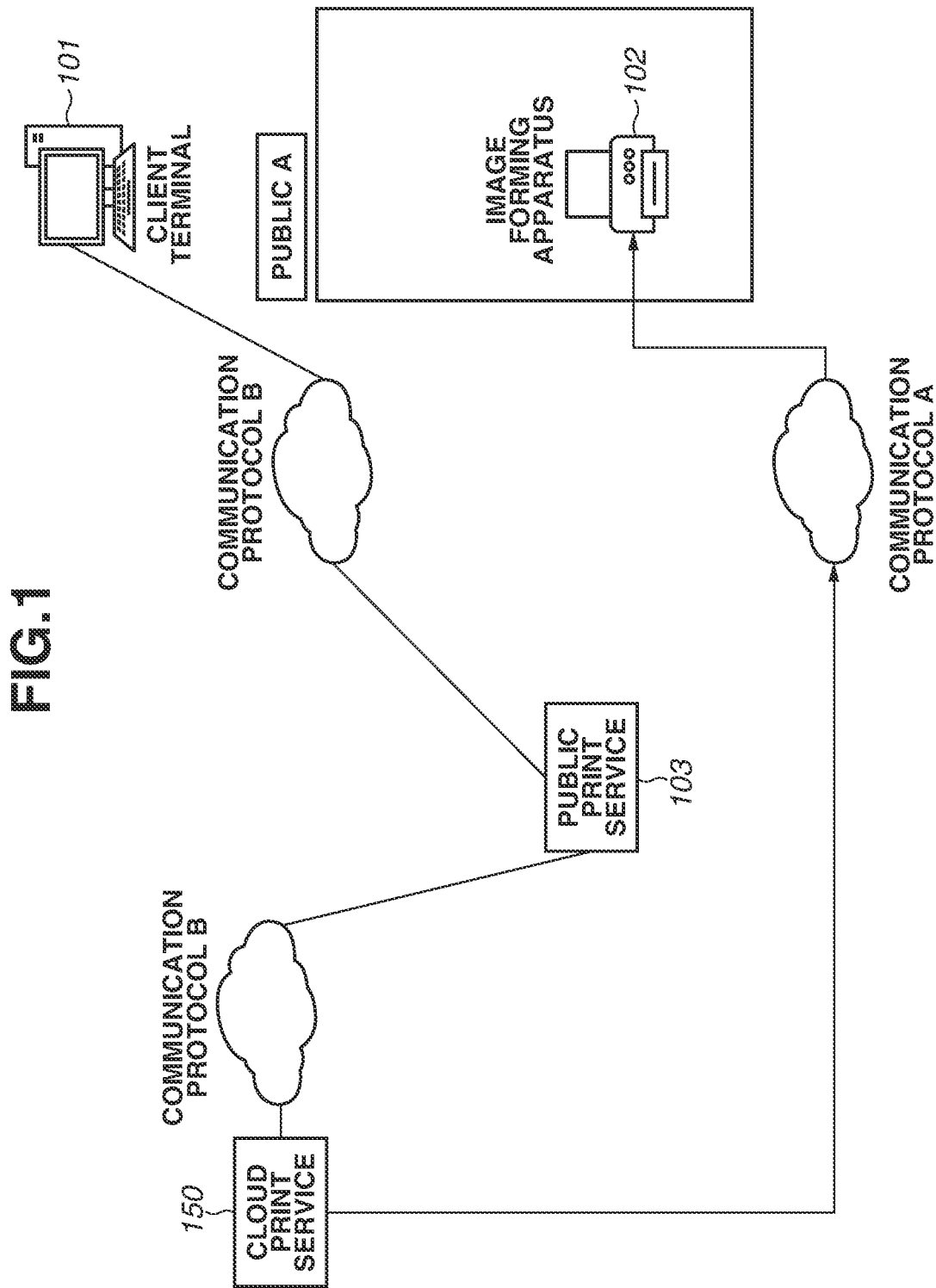
FIG. 1 is an entire configuration diagram of a system.

A first exemplary embodiment of the present disclosure will be described below. FIG. 1 is an entire configuration diagram of a system according to the present exemplary embodiment in the present disclosure.

A public print service (hereinafter, referred to as PPS) 103 is a management system that provides store management services, such as search and reservation for stores to be used and payment of a cost based on, for example, the length of the time spent at the stores. The PPS 103 receives and saves a print job from a client terminal 101. The PPS 103 transmits job information and tenant information to a cloud print service (hereinafter, referred to as CPS) 150. The tenant information herein refers to information about a tenant for the PPS 103. In response to receiving a print job request from an image forming apparatus 102, the CPS 150 transmits the print job to the image forming apparatus 102. The CPS 150 is a print system that provides a print service. In response to receiving the print job from the CPS 150, the image forming apparatus 102 executes printing.

Public A represents a store that provides a public print service. Communication between the CPS 150 and a network in a store of the public A is performed using a communication protocol A. Communication between the CPS 150 and the PPS 103 and communication between the PPS 103 and the client terminal 101 are performed using a communication protocol B. Thus, the CPS 150, the PPS 103, the client terminal 101, and the image forming apparatus 102 are communicably connected together.

Figure 2:
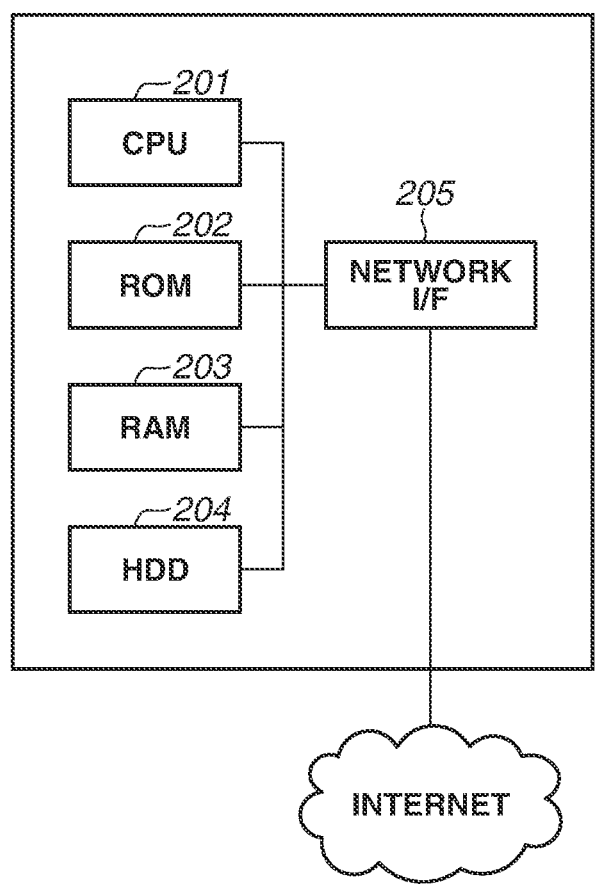
FIG. 2 is a diagram illustrating an example of a hardware configuration.

FIG. 2 is a diagram illustrating a hardware configuration example of a server computer present on a data center for constructing the PPS 103 and the CPS 150 illustrated in FIG. 1. Hardware configuration of a typical information processing apparatus is similarly applicable to the client terminal and the image forming apparatus in the present exemplary embodiment.

One or more processors (e.g., a central processing unit (CPU) 201) control the entire operation of the server computer by reading and executing control programs stored in a read only memory (ROM) 202. A random access memory (RAM) 203 is used as a main memory, a work area, and the like for the CPU 201. A hard disk device (HDD) 204 is a large-capacity storage unit that stores image data and various programs. A network interface (I/F) 205 is an interface that connects the CPS 150 to the Internet. The CPS 150 performs various processes in response to receiving process requests from the client terminal, the image forming apparatus, and/or other CPSs 150, and transmits and receives information, via the network I/F 205.

Figure 3:
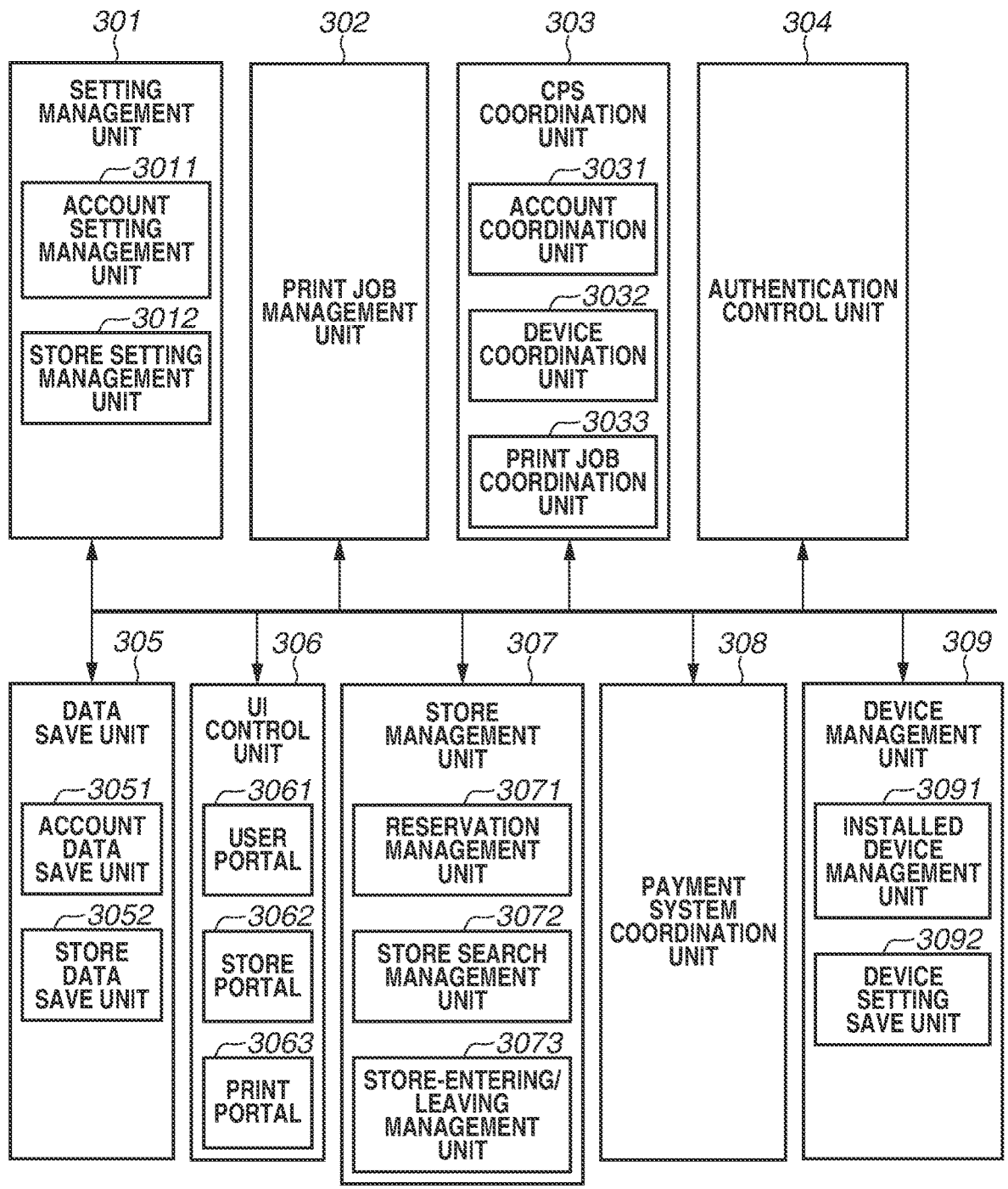
FIG. 3 is a diagram illustrating an example of a software configuration of a public print service.

FIG. 3 is a diagram illustrating an example of a software configuration of the PPS 103 in the first exemplary embodiment. The software configuration illustrated in FIG. 3 is implemented, for example, by the CPU 201 reading the programs from the ROM 202 into the RAM 203 and executing them.

A setting management unit 301 stores settings of various functions of the PPS 103 in the storage devices, such as the RAM 203 and the HDD 204, and reads the settings from these storage devices. The setting management unit 301 includes an account setting management unit 3011 and a store setting management unit 3012. At the time of user registration, the account setting management unit 3011 saves user information in an account data save unit 3051 of a data save unit 305. The user information includes, but not limited to, an account name, a log-in password, whether the user has checked in at the store, account information in a cloud storage service, information about transmission destination of scanned data, and the like. The user checks in, when entering a store, by reading a two-dimensional barcode (e.g., a quick response (QR) Code®) provided at the store using his/her own mobile terminal or logging in to a client terminal installed at the store or by requesting store staff to perform a check-in procedure. The account setting management unit 3011 transmits part of the account data to the CPS 150 through an account coordination unit 3031 of a CPS coordination unit 303. When a store administrator registers his/her own store, the store setting management unit 3012 saves store information in a store data save unit 3052 of the data save unit 305. The store information includes, but not limited to, store location information, store usage fee, store amenities, and the like.

A print job management unit 302 transmits a print job and print-job-related information received from the client terminal 101 to the CPS 150 through a print job coordination unit 3033 of the CPS coordination unit 303. The print job management unit 302 of the PPS 103 determines whether "printing in public space" is permitted for the print job received from the client terminal 101 and issues job execution permission information.

The CPS coordination unit 303 includes the account coordination unit 3031, a device coordination unit 3032, and the print job coordination unit 3033. The account coordination unit 3031 mainly performs user registration and deletion to/from the CPS 150, and transmits and receives account information. The device coordination unit 3032 performs registration and deletion of the image forming apparatuses 102 installed in companies or stores, and transmits and receives device information for these devices. The device information includes, but is not limited to, IP addresses and capabilities of the devices and information about stores in which the devices are installed. The print job coordination unit 3033 mainly transmits a print job to the CPS 150.

An authentication control unit 304 performs, in particular, control regarding log-in, in the account setting management unit 3011. The authentication control unit 304 may cooperate with an external authentication service.

The data save unit 305 saves the corresponding data in response to a request from the account setting management unit 3011 or the store setting management unit 3012.

A user interface (UI) control unit 306 generates a screen in response to a request from the client terminal 101 or the image forming apparatus 102 and transmits the generated screen. The UI control unit 306 includes a user portal 3061, a store portal 3062, and a print portal 3063. For example, in response to a request from a browser of the client terminal 101, the UI control unit 306 generates a screen, and displays the generated screen on the client terminal 101 via the user portal 3061. The store portal 3062 is mainly used by the store administrator to input store information and check the utilization status of the store. The print portal 3063 is displayed on a monitor 211 of the client terminal 101, thus enabling the user to input a print job by drag-and-drop and check the status of the print job.

A store management unit 307 includes a reservation management unit 3071, a store search management unit 3072, and a store-entering/leaving management unit 3073. The reservation management unit 3071 manages reservations for use of the store through the user portal 3061. The store search management unit 3072 searches for a store in accordance with the user's requests, through the information in the store data save unit 3052 and the information about the current vacancy status of stores. The store search management unit 3072 displays, for example, a map to grasp the user's current location and search for a store near the current location or the designated location. The store-entering/leaving management unit 3073 manages check-in/check-out of the users having made reservations.

A payment system coordination unit 308 calculates the cost in accordance with the user's store utilization and enables the user to settle the account in cooperation with an external service.

A device management unit 309 includes an installed device management unit 3091 and a device setting save unit 3092. The installed device management unit 3091 manages model type information for the devices installed in the stores. The installed device management unit 3091 manages information about a plurality of image forming apparatuses installed in a plurality of stores. The device setting save unit 3092 saves device settings corresponding to the stores. The installed device management unit 3091 updates the device settings saved in the device setting save unit 3092, for example, from information about the image forming apparatuses belonging to the PPS 103 and information about availability and non-availability of the image forming apparatuses. For example, the device setting save unit 3092 can set only the functions requiring user authentication among the print and scan functions of the image forming apparatuses installed in the stores.

Figure 4:
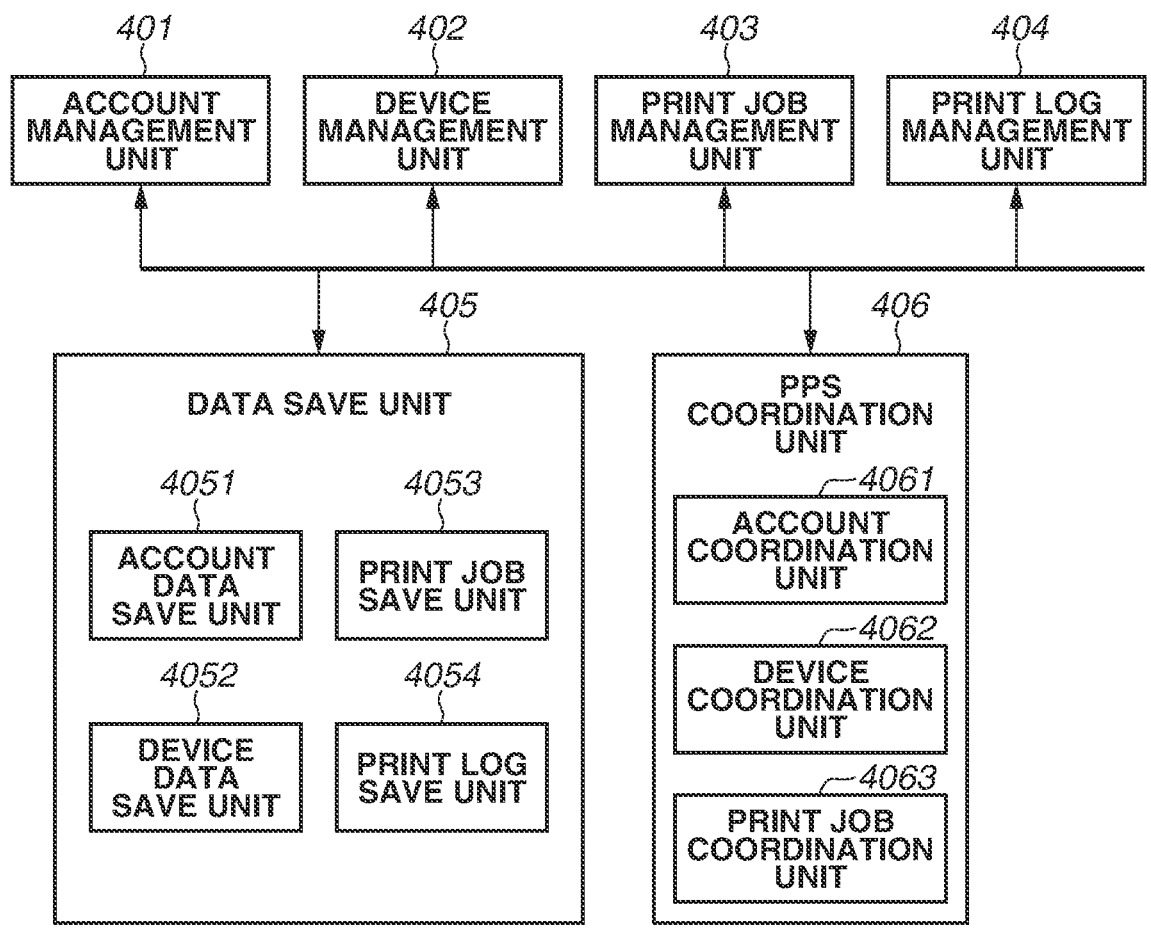
FIG. 4 is a diagram illustrating an example of a software configuration of a cloud print service.

FIG. 4 is a diagram illustrating an example of a software configuration of the CPS 150 in the first exemplary embodiment.

The software configuration illustrated in FIG. 4 is implemented by the CPU 201 reading, for example, the programs from the ROM 202 into the RAM 203 and executing them.

An account management unit 401 performs registration and deletion of accounts and manages the log-in status for the accounts. The information about the registered accounts is saved in an account data save unit 4051 of the data save unit 405. The account management unit 401 also performs registration and deletion of specified users, and transmits and receives user information about the specified users, through an account coordination unit 4061 of a PPS coordination unit 406.

A device management unit 402 performs registration and deletion of devices, and manages the utilization status of the devices. The information about the registered devices is saved in a device data save unit 4052 of the data save unit 405. The device management unit 402 also transmits and receives the specified device information through a device coordination unit 4062 of the PPS coordination unit 406.

A print job management unit 403 receives a print job and transmits a print job. The print job management unit 403 saves the received print job in the print job save unit 4053 of the data save unit 405, and transmits the print job to the specified device in response to a request from the image forming apparatus 102. The print job management unit 403 can also receive a print job through a print job coordination unit 4063 of the PPS coordination unit 406.

A print log management unit 404 acquires a print log from the image forming apparatus 102. The print log refers to details of printing that has been set and output by the user, such as the size of the printed paper, color or monochrome printing, and double-sided printing or single-sided printing. The past print logs can be saved as print reports in an external storage at specific intervals. This enables an external public service such as the PPS 103 to book a fee for printing as cost.

The data save unit 405 uses the storage devices, such as the RAM 203 and the HDD 204 of the CPS 150, to save the account information and the device information. The data save unit 405 includes the account data save unit 4051, the device data save unit 4052, the print job save unit 4053, and a print log save unit 4054. The account data save unit 4051 saves information related to the accounts. The account information relates to users registered with the CPS 150 and includes information for identifying the users, the departments to which the users belong, and account privileges. The device data save unit 4052 saves information about the devices registered with the CPS 150. The information about device includes model names of the devices, information used for identifying the devices, and device location information. The print job save unit 4053 saves print jobs and biographic information about the print jobs to be saved in the CPS 150. The print log save unit 4054 saves printed results acquired from the devices that have executed the print jobs.

The PPS coordination unit 406 includes the account coordination unit 4061, the device coordination unit 4062, and the print job coordination unit 4063. The account coordination unit 4061 mainly accepts instructions to perform user registration/deletion/change from the PPS 103, and transmits and receives account information. The device coordination unit 4062 receives instructions to perform registration/deletion of the image forming apparatus 102 from the PPS 103. The print job coordination unit 4063 mainly receives print jobs from the PPS 103.

Figure 5:
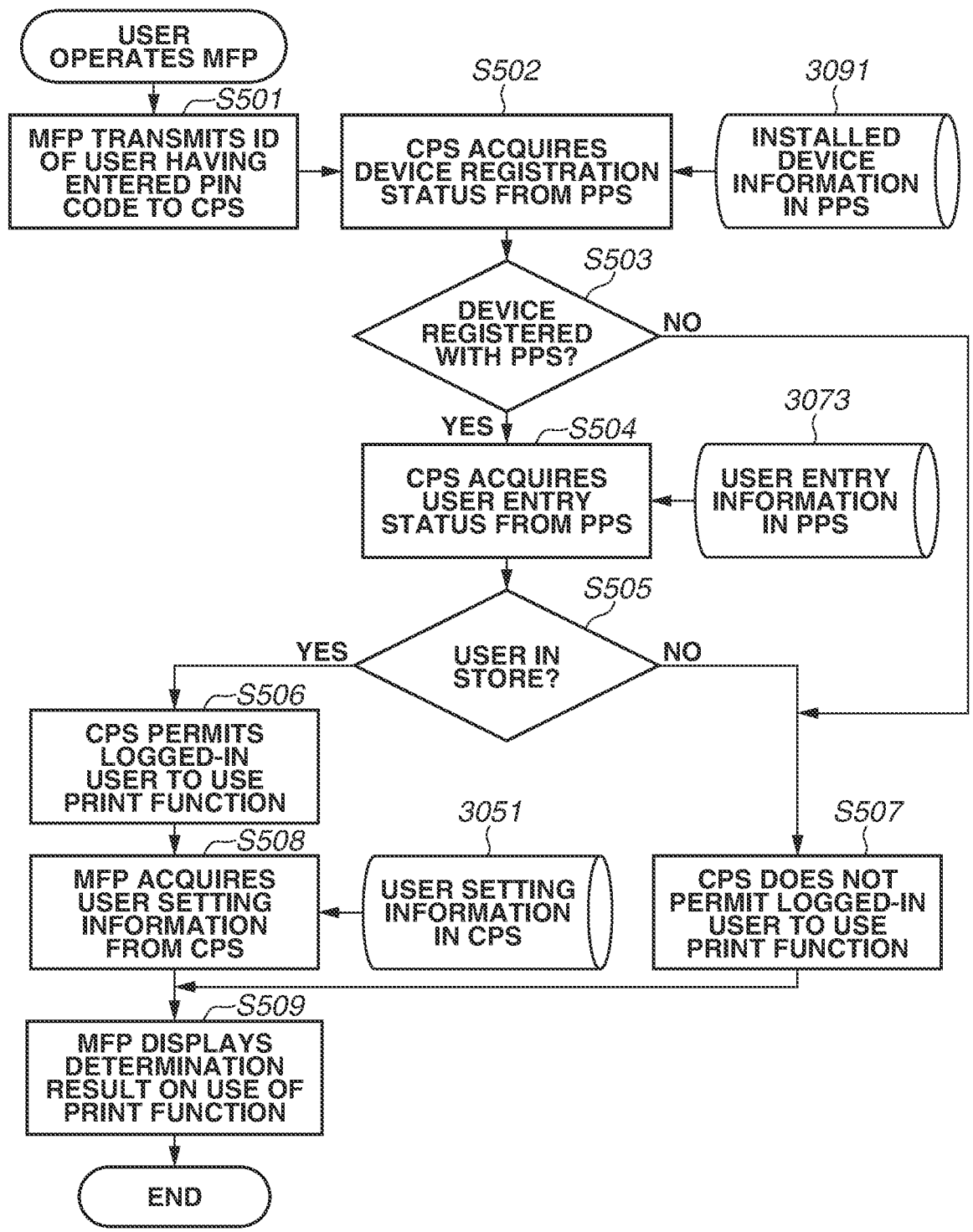
FIG. 5 is a flowchart of authentication using information about entry of a user to a store at execution of printing.

FIG. 5 is a flowchart of a process to be executed when the user logs in to the image forming apparatus 102 to use the print function according to the first exemplary embodiment.

This process is performed when the image forming apparatus 102 executes a print job having been input from the client terminal 101 based on a user's instruction.

In step S501, the user enters authentication information such as a pass code, preset by the user, into the image forming apparatus 102 to perform authentication to use the print function. In response to this, the image forming apparatus 102 identifies the user who has attempted to perform authentication and transmits the user ID of the user to the CPS 150. At this time, a screen 800 is displayed on a panel of the image forming apparatus 102.

In step S502, the CPS 150 receives identification information for the device to which the user ID has been transmitted in step S501. The CPU 150 receives registered device information from the PPS 103. The registered device information may also be managed in the CPS 150.

In step S503, the CPS 150 determines whether the device information for the image forming apparatus 102 is present in the registered device information received from the PPS 103. This makes it possible to check if the image forming apparatus 102 is installed in the public space. If the CPS 150 determines that the device is registered with the PPS 103 (YES in step S503), the processing proceeds to step S504. If the CPS 150 determines that the device is not registered (NO in step S503), the processing proceeds to step S507.

In step S504, the CPS 150 acquires from the PPS 103 the current store entry status of the user having the user ID received from the image forming apparatus 102 in step S501.

In step S505, the CPS 150 compares the user having been authenticated at the image forming apparatus 102 to the store entry status acquired in step S504 to check if the user is in the store in which the image forming apparatus 102 has been installed. If the CPS 150 verifies that the user is in the store in which the image forming apparatus 102 has been installed (YES in step S505), the processing proceeds to step S506. If the CPS 150 verifies that the user is not in any store (NO in step S505), the processing proceeds to step S507. If the user is in a store different from the store in which the image forming apparatus 102 has been installed (NO in step S505), the processing proceeds to step S507 as well.

In step S506, the CPS 150 transmits the result of the determination in step S505 to the image forming apparatus 102. Since the CPS 150 verifies that the user is in the store in which the image forming apparatus 102 has been installed, in step S506, the image forming apparatus 102 permits the user to use the print function.

In step S507, the CPS 150 transmits the result of the determination in step S505 to the image forming apparatus 102. Since the CPS 150 verifies that the user is not in the store in which the image forming apparatus 102 has been installed, in step S507, the image forming apparatus 102 does not permit the user to use the print function.

In step S508, the image forming apparatus 102, which has permitted the use of the print function, requests the user setting information which has been preset by the user, from the CPS 150. The user setting information includes account information in the cloud storage service from which the file to be printed will be acquired, the e-mail address to which the scanned data will be transmitted, and the like.

If the CPS 150 verifies that the user is in the store in which the image forming apparatus 102 has been installed, in step S509, a screen 810 is displayed on the panel of the image forming apparatus 102. If the CPS 150 verifies that the user is not in the store in which the image forming apparatus 102 has been installed, in step S509, a screen 820 is displayed on the panel of the image forming apparatus 102.

Figure 6:
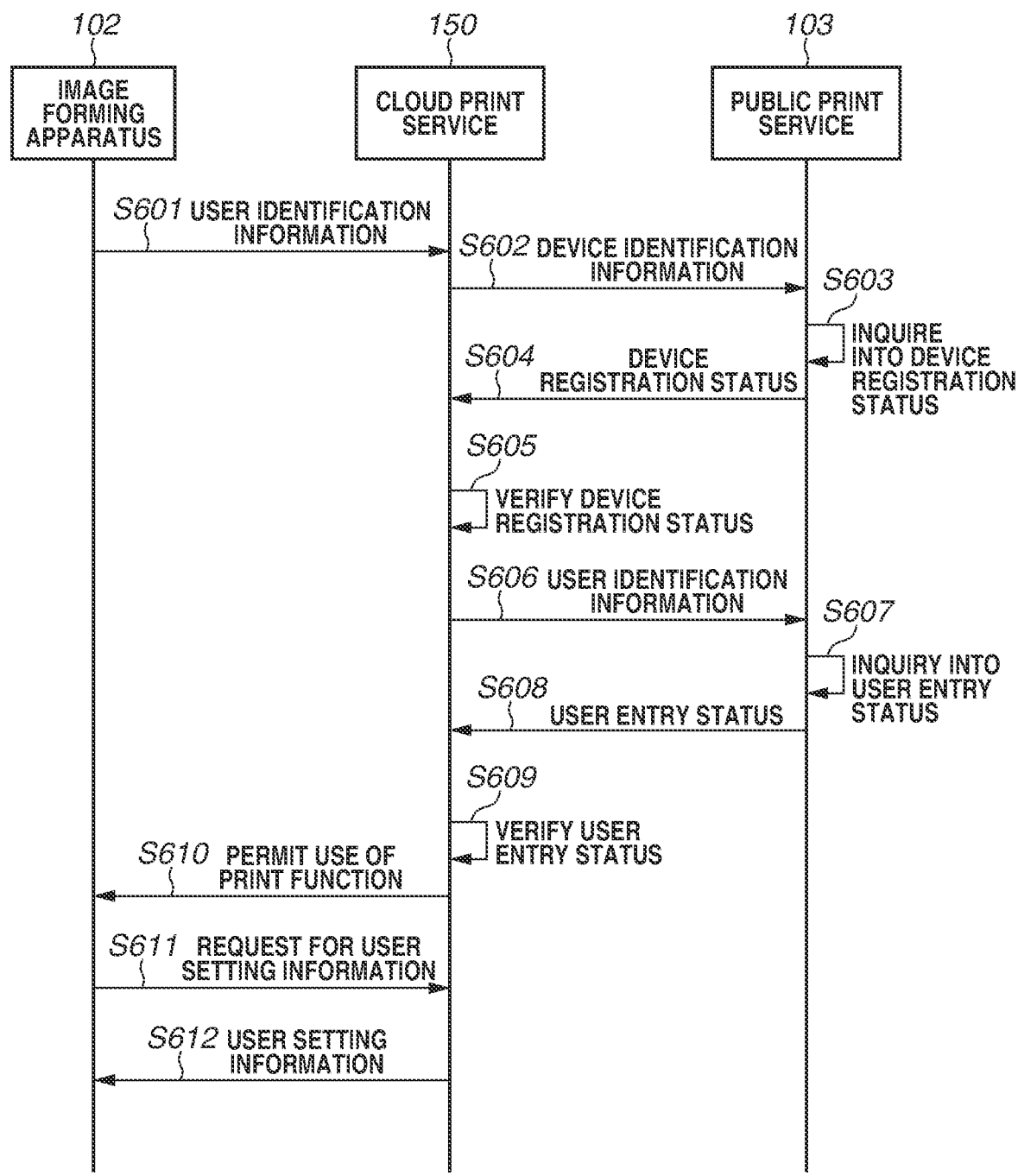
FIG. 6 is a sequence diagram in a case where the user is in the store at execution of printing.

FIG. 6 is a sequence diagram in a case where the user logs in to the image forming apparatus 102 to use the print function in the first exemplary embodiment.

Figure 8A:
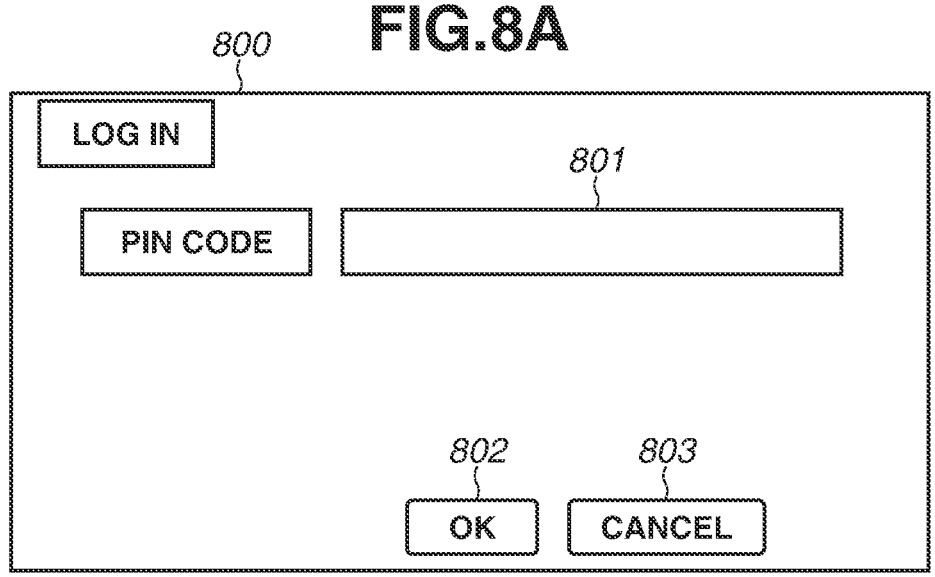
FIGS. 8A to 8C are diagrams illustrating an example of authentication screens to be displayed on an operation unit of an image forming apparatus.

In step S601, the image forming apparatus 102 transmits to the CPS 150 the user identification information used for identifying the user who is attempting to use the print function using authentication information, such as a passcode. FIG. 8A is a diagram illustrating an example of an authentication screen displayed on the operation unit of the image forming apparatus 102. The user enters information used for identifying the user, such as a PIN code, into an entry field 801 on the screen 800 and selects the OK button 802 to transmit the entered information to the CPS 150. If the user selects the cancel button 803, the entered information is not transmitted to the CPS 150.

In step S602, the PPS coordination unit 406 transmits the device identification information to the PPS 103 to determine whether the image forming apparatus 102 has been installed in the public space.

In step S603, the device management unit 309 determines whether the image forming apparatus 102 has been already registered with the PPS 103.

In step S604, the CPS coordination unit 303 transmits the result of the determination in step S603 to the CPS 150.

In step S605, based on the received result of the determination on the device registration status, the device management unit 402 determines whether the image forming apparatus 102 has been installed in the public space.

If it is determined in step S605 that the image forming apparatus 102 has been installed in the public space, in step S606, the CPS 150 transmits the user identification information to the PPS 103. If it is determined in step S605 that the image forming apparatus 102 has not been installed in the public space, the processing may be ended.

In step S607, the store management unit 307 acquires store entry information indicating in which store the user who has the received user identification information is currently located.

In step S608, the CPS coordination unit 303 transmits the store entry information acquired in step S607 to the CPS 150.

In step S609, based on the store entry information for the user received in step S608, the account management unit 401 determines whether the user is in the store in which the image forming apparatus 102 has been installed.

Figure 8B:
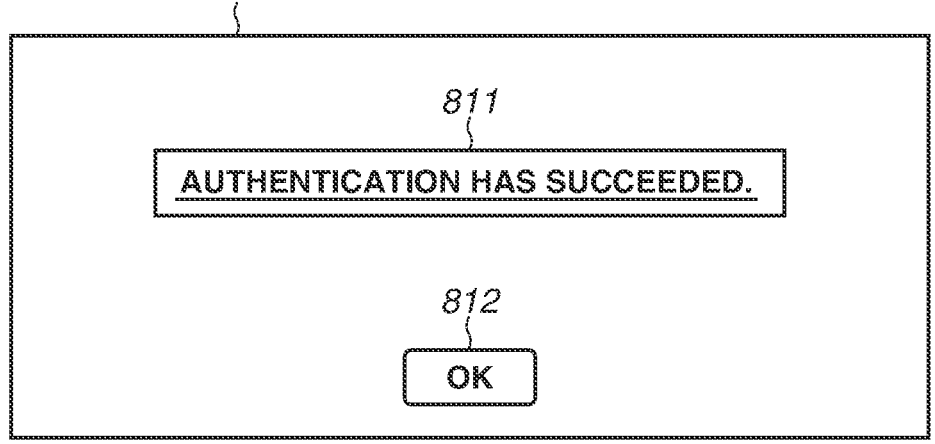
Figure 8C:
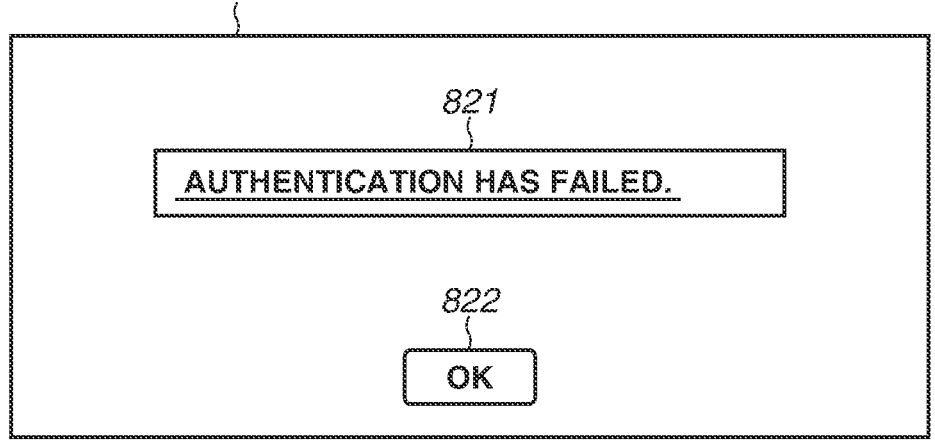

If it is determined that the user is in the store in which the image forming apparatus 102 has been installed, in step S610, the account management unit 401 instructs the image forming apparatus 102 to permit the user to use the print function. FIG. 8B illustrates an example of a screen displayed on the operation unit of the image forming apparatus 102 in the case where the user authentication has succeeded. A message indicating that the user authentication has succeeded is displayed on the screen 810. If the user selects an OK button 812, the screen transitions to the next screen. FIG. 8C illustrates an example of a screen to be displayed on the operation unit of the image forming apparatus 102 in the case where the user authentication has failed. A message 821 indicating that the user authentication has failed is displayed on the screen 820. If the user selects an OK button 822, the screen transitions to the next screen.

In step S611, the image forming apparatus 102 requests the user setting information that has been preset by the user, such as the cloud storage service and the e-mail address of the transmission destination, from the CPS 150.

In step S612, the CPS 150 transmits the user setting information to the image forming apparatus 102. In the image forming apparatus 102, processes such as acquisition of a list of print jobs based on the received user setting information are performed, and thus, the use of the print function is enabled.

FIG. 7 is a sequence diagram illustrating a process for the user's entering/leaving (check-in/check-out) to/from the store, using the client terminal 101 according to the present exemplary embodiment.

In step S701, the client terminal 101 transmits a check-in request and the ID of the user who is attempting to check in to the store management unit 307 of the PPS 103.

In step S702, the store management unit 307 performs a user check-in process. After that, the processing proceeds to step S703. In the check-in process, for example, the store-entering/leaving management unit 3073 sets the number and name of the store that is currently being used to the check-in status in accordance with a table as illustrated in Table A.

In step S703, the store management unit 307 transmits a notification of completion of the check-in process to the client terminal 101.

In step S704, the client terminal 101 transmits a check-out request and the ID of the user who is attempting to check out to the store management unit 307 of the PPS 103.

In step S705, the store management unit 307 performs a user check-out process. After that, the processing proceeds to step S706. In the check-out process, for example, the store-entering/leaving management unit 3073 sets the check-in status to null or a value that is not present as a store name in accordance with the table as illustrated in a check-in management table (Table A).

TABLE A

Table A: Check-in Management Table

| User Name | Check-In Status |
|---|---|
| User 01 | Store A |
| User 02 | Null |
| User 03 | Store B |

In step S706, the store management unit 307 transmits a notification of completion of the check-out process to the client terminal 101.

The check-in and check-out processes using the client terminal have been described above in conjunction with FIG. 5. In another embodiment, the check-in and check-out processes may be performed in a different manner. For example, the user may pass an IC card issued by the store or another IC card owned by the user over a card reader installed in the store. Alternatively, the store staff may operate a PC when the user enters the store to change the status of the visiting user to the store entry status.

As described above, in the present exemplary embodiment, if the user has entered a store, the CPS 150 permits the user to use an image forming apparatus installed in the store. In contrast to this, if the user is not in the store, the CPS 150 does not permit the user to use the image forming apparatus installed in the store. According to the present exemplary embodiment, it is possible to prevent a third party from abusing the account of a user who is not in the store and wrongfully using the image forming apparatus installed in the store.

According to the present embodiment, it is possible to control the use of an image forming apparatus installed in a store which is a public space, in accordance with the store entry status of users.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-140734, which was filed on Aug. 31, 2021 and which is hereby incorporated by reference herein in its entirety.

What is claimed is:

1. A print system communicable with a plurality of image forming apparatuses via a network, the print system comprising:
one or more memories storing a set of instructions; and
one or more processors that execute the set of instructions to:
manage information about the plurality of image forming apparatuses installed in a plurality of stores;
receive user identification information from a first image forming apparatus;
permit, in a case where the managed information includes information about the first image forming apparatus being installed in a first store and where a user indicated by the received user identification information is in the first store, the user to use the first image forming apparatus; and
not permit, in a case where the managed information does not include information about the first image forming apparatus being installed in the first store or where the user indicated by the received user identification information is not in the first store, the user to use the first image forming apparatus.

2. The print system according to claim 1,
wherein, in a case where the managed information includes information about the first image forming apparatus being installed in the first store and where the user indicated by the received user identification information is in the first store, the user is permitted to log in to the first image forming apparatus, and
wherein, in a case where the managed information does not include information about the first image forming apparatus being installed in the first store or where the user indicated by the received user identification information is not in the first store, the user is not permitted to log in to the first image forming apparatus.

3. The print system according to claim 1, wherein, in a case where the managed information includes information about the first image forming apparatus being installed in the first store and where the user indicated by the received user identification information is in the first store, the user is permitted to use a print function of the first image forming apparatus, and wherein, in a case where the managed information does not include information about the first image forming apparatus being installed in the first store or where the user indicated by the received user identification information is not in the first store, the user is not permitted to use the print function of the first image forming apparatus.

4. The print system according to claim 1, wherein the print system is communicable with a management system that provides a store management service, and wherein the one or more processors further execute the set of instructions to acquire information about user's entering and leaving of the first store from the management system.

5. A control method for controlling a print system communicable with a plurality of image forming apparatuses via a network, the control method comprising:

managing information about the plurality of image forming apparatuses installed in a plurality of stores;

receiving user identification information from a first image forming apparatus;

permitting, in a case where the managed information includes information about the first image forming apparatus being installed in a first store and where a user indicated by the received user identification information is in the first store, the user to use the first image forming apparatus; and not permitting, in a case where the managed information does not include information about the first image forming apparatus being installed in the first store or where the user indicated by the received user identification information is not in the first store, the user to use the first image forming apparatus.

* * * * *